United States Patent
Fadaie et al.

(10) Patent No.: US 11,586,200 B2
(45) Date of Patent: Feb. 21, 2023

(54) METHOD AND SYSTEM FOR VEHICLE ENGAGEMENT CONTROL

(71) Applicant: The Boeing Company, Chicago, IL (US)

(72) Inventors: Joshua G. Fadaie, Saint Louis, MO (US); Richard Hanes, Ballwin, MO (US); Chun Kit Chung, Saint Louis, MO (US); Sean Soleyman, Calabasas, CA (US); Deepak Khosla, Camarillo, CA (US)

(73) Assignees: The Boeing Company, Chicago, IL (US); HRL Laboratories LLC, Malibu, CA (US)

( * ) Notice: Subject to any disclaimer, the term of this patent is extended or adjusted under 35 U.S.C. 154(b) by 309 days.

(21) Appl. No.: 16/908,199

(22) Filed: Jun. 22, 2020

(65) Prior Publication Data

US 2021/0397179 A1    Dec. 23, 2021

(51) Int. Cl.
*G05D 1/00* (2006.01)
*G06F 9/38* (2018.01)
(Continued)

(52) U.S. Cl.
CPC ......... *G05D 1/0027* (2013.01); *G05D 1/0022* (2013.01); *G05D 1/106* (2019.05);
(Continued)

(58) Field of Classification Search
CPC .... G05D 1/0027; G05D 1/0022; G05D 1/106; G06F 9/3818; G06K 9/6256;
(Continued)

(56) References Cited

U.S. PATENT DOCUMENTS

2012/0101666 A1*  4/2012  Hill ............... G05D 1/0055
                                                    701/3
2014/0170601 A1*  6/2014  Wokurka ........... G09B 9/003
                                                   434/35

(Continued)

FOREIGN PATENT DOCUMENTS

CN           108290579 B  *  4/2022  .............. B60L 15/20

OTHER PUBLICATIONS

English Translation of CN 108290579 B.*
(Continued)

*Primary Examiner* — Rami Khatib
*Assistant Examiner* — Shahira Baajour
(74) *Attorney, Agent, or Firm* — McDonnell Boehnen Hulbert & Bergoff LLP

(57) ABSTRACT

A method includes receiving, by machine-learning logic, observations indicative of a states associated with a first and second group of vehicles arranged within an engagement zone during a first interval of an engagement between the first and the second group of vehicles. The machine-learning logic determines actions based on the observations that, when taken simultaneously by the first group of vehicles during the first interval, are predicted by the machine-learning logic to result in removal of one or more vehicles of the second group of vehicles from the engagement zone during the engagement. The machine-learning logic is trained using a reinforcement learning technique and on simulated engagements between the first and second group of vehicles to determine sequences of actions that are predicted to result in one or more vehicles of the second group being removed from the engagement zone. The machine-learning logic communicates the plurality of actions to the first group of vehicles.

20 Claims, 7 Drawing Sheets

(51) Int. Cl.
*G06N 20/00* (2019.01)
*G06K 9/62* (2022.01)
*G05D 1/10* (2006.01)

(52) U.S. Cl.
CPC ......... *G06F 9/3818* (2013.01); *G06K 9/6256* (2013.01); *G06N 20/00* (2019.01)

(58) Field of Classification Search
CPC .... G06N 20/00; G06N 3/0445; G06N 3/0454; G06N 3/08; G06V 10/82; G06V 20/17
See application file for complete search history.

(56) References Cited

U.S. PATENT DOCUMENTS

2020/0379486 A1* 12/2020 Khosla .................. G05D 1/101
2021/0065003 A1* 3/2021 Chen ....................... G09B 9/50

OTHER PUBLICATIONS

N. Ernest et. al. Genetic Fuzzy based Artificial Intelligence for Unmanned Combat Aerial Vehicle Control in Simulated Air Combat Missions. Journal of Defense Management, 2016.

A. Toubman et al. Dynamic Scripting with Team Coordination in Air Combat Simulation. Proceedings of the 27th International Conference on Industrial, Engineering & Other Applications of Applied Intelligent Systems, Springer-Verlag. (Presented at the IEAAIE 2014 conference).

P. Liu and Y. Ma. A Deep Reinforcement Learning Based Intelligent Decision Method for UCAV Air Combat. 17th Asia Simulation Conference, AsiaSim 2017 Melaka, Malaysia, Aug. 27-29, 2017 Proceedings, Part I.

V. Konda and J. Tsitsiklis. Actor-Critic Algorithms. NIPS, 2000.

R. Williams. Simple Statistical Gradient-Following Algorithms for Connectionist Reinforcement Learning. Machine Learning, 1992.

V. Mnih et. al. Asynchronous Methods for Deep Reinforcement Learning. Arxiv, 2016.

J. McGrew et. al. Air-Combat Strategy Using Approximate Dynamic Programming. Journal of Guidance, Control, and Dynamics, vol. 33, No. 5, 2010.

Luong et al. Effective Approaches to Attention-based Neural Machine Translation. Arxiv, 2015.

Peng et. al. Multi-agent Bidirectionally-Coordinated Nets. Arxiv, 2017.

U.S. Appl. No. 16/423,892, Not yet published.

Vinyals et. al. Pointer Networks. Arxiv, 2017.

Grandmaster level in StarCraft II using multi-agent reinforcement learning, published Oct. 30, 2019, Nature, vol. 575.

* cited by examiner

METHOD AND SYSTEM FOR VEHICLE ENGAGEMENT CONTROL

This invention was made with Government support under Contract No. SI3-CMD 18099-190230-US awarded by the Defense Advanced Research Projects Agency. The Government has certain rights in this invention.

BACKGROUND

Field

The subject disclosure generally relates to engagements or interactions between vehicles. More particularly, the disclosure relates to a method and system for vehicle engagement control.

Description of Related Art

Vehicles can be controlled by humans and by autonomous control systems. In the context of multiple aircraft operating in adversarial and cooperative scenarios, the aircraft are often controlled by human pilots. Such scenarios involve flexible reactions to events occurring within an engagement zone, including events caused by the other aircraft and environmental events, such as changes in weather, terrain, or other conditions. Autonomously flown aircraft are frequently utilized in single aircraft scenarios, such as ground surveillance scenarios. Some autonomous control systems can be used in two-aircraft scenarios. Such autonomous control systems typically include rule-based systems that use rules of the system to perform pre-programmed behaviors in these scenarios.

SUMMARY

In a first aspect, a computer-implemented method includes receiving, by machine-learning logic of a computer, a plurality of observations indicative of a plurality of states associated with a first group of vehicles and a second group of vehicles arranged within an engagement zone during a first interval of an engagement between the first group of vehicles and the second group of vehicles. The machine-learning logic of the computer determines a plurality of actions based on the plurality of observations that, when taken simultaneously by the first group of vehicles during the first interval, are predicted by the machine-learning logic to result in removal of one or more vehicles of the second group of vehicles from the engagement zone during the engagement. The machine-learning logic is trained using a reinforcement learning technique and on a plurality of simulated engagements between the first group of vehicles and the second group of vehicles to determine sequences of actions that are predicted to result in the one or more vehicles of the second group of vehicles being removed from the engagement zone. The machine-learning logic of the computer communicates the plurality of actions to the first group of vehicles.

In a second aspect, a system includes a memory that stores instruction code and a processor in communication with the memory. The instruction code is executable by the processor to perform operations that include receiving, by machine-learning logic implemented by the instruction code, a plurality of observations indicative of a plurality of states associated with a first group of vehicles and a second group of vehicles arranged within an engagement zone during a first interval of an engagement between the first group of vehicles and the second group of vehicles. The machine-learning logic determines a plurality of actions based on the plurality of observations that, when taken simultaneously by the first group of vehicles during the first interval, are predicted by the machine-learning logic to result in removal of one or more vehicles of the second group of vehicles from the engagement zone during the engagement. The machine-learning logic is trained using a reinforcement learning technique and on a plurality of simulated engagements between the first group of vehicles and the second group of vehicles to determine sequences of actions that are predicted to result in the one or more vehicles of the second group of vehicles being removed from the engagement zone. The machine-learning logic communicates the plurality of actions to the first group of vehicles.

In a third aspect, a non-transitory computer-readable medium has stored thereon instruction code. The instruction code is executable by a processor of a computer to perform operations that include receiving, by machine-learning logic implemented by the instruction code, a plurality of observations indicative of a plurality of states associated with a first group of vehicles and a second group of vehicles arranged within an engagement zone during a first interval of an engagement between the first group of vehicles and the second group of vehicles. The machine-learning logic determines a plurality of actions based on the plurality of observations that, when taken simultaneously by the first group of vehicles during the first interval, are predicted by the machine-learning logic to result in removal of one or more vehicles of the second group of vehicles from the engagement zone during the engagement. The machine-learning logic is trained using a reinforcement learning technique and on a plurality of simulated engagements between the first group of vehicles and the second group of vehicles to determine sequences of actions that are predicted to result in the one or more vehicles of the second group of vehicles being removed from the engagement zone. The machine-learning logic communicates the plurality of actions to the first group of vehicles.

The above summary is not an extensive overview of the specification. It is intended to neither identify key or critical elements of the specification nor delineate any scope particular embodiments of the specification, or any scope of the claims. Its sole purpose is to present some concepts of the specification in a simplified form as a prelude to the more detailed description that is presented in this disclosure.

BRIEF DESCRIPTION OF THE DRAWINGS

The accompanying drawings are included to provide a further understanding of the claims, are incorporated in, and constitute a part of this specification. The detailed description and illustrated examples described serve to explain the principles defined by the claims.

DETAILED DESCRIPTION

Figure 1:
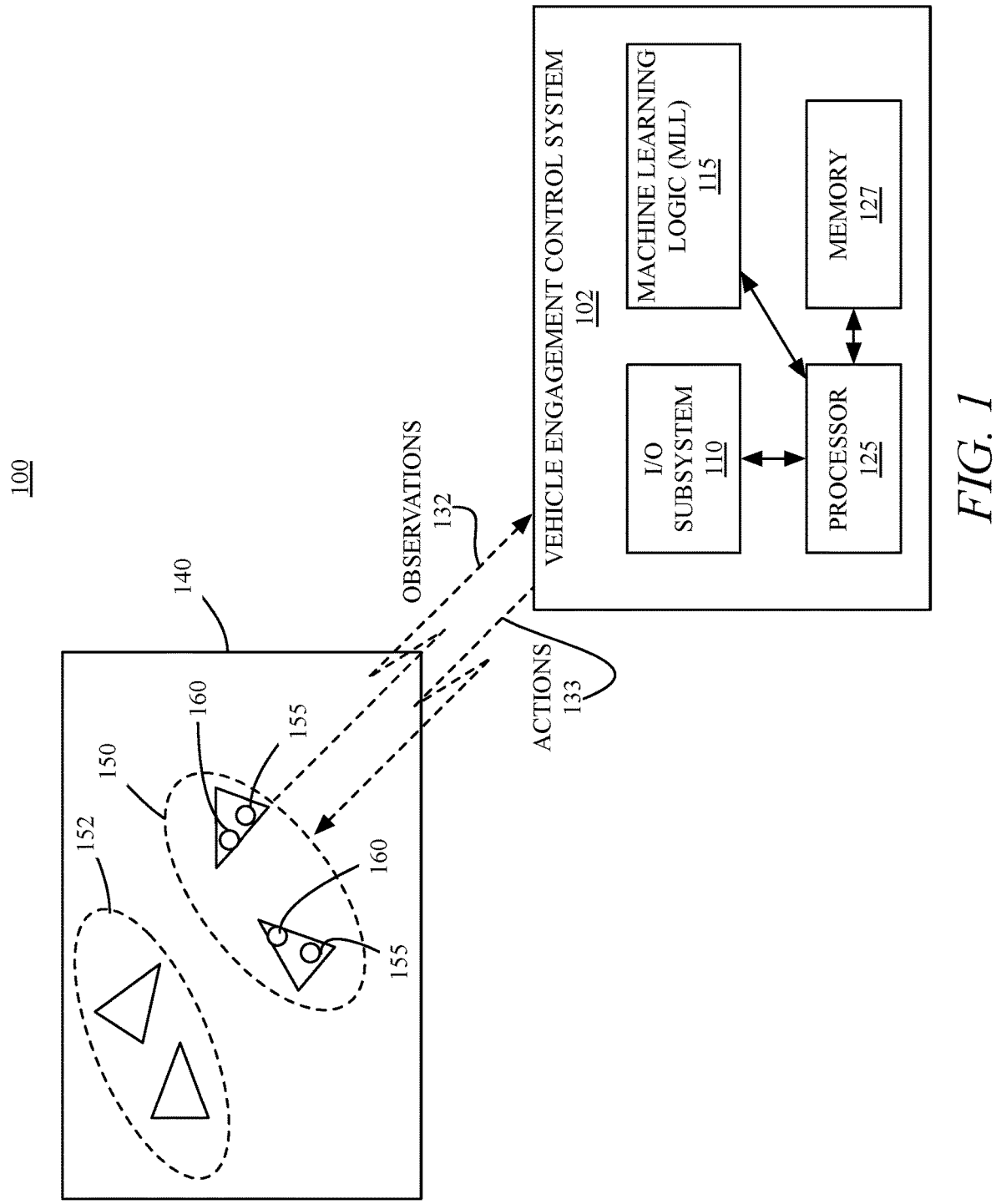
FIG. 1 illustrates an environment in which a vehicle engagement control system (VECS) operates, in accordance with an example.

Implementations of this disclosure provide technological improvements that are particular to autonomous control systems of a vehicle. In this regard, a vehicle engagement control system (VECS) includes machine-learning logic configured to receive observations from a first group of vehicles operating in an engagement zone with a second group of vehicles. The VECS communicates actions to control the first group of vehicles based on the observations. The choice and sequence of actions are selected to remove the second group of vehicles from the engagement zone while simultaneously minimizing the number/amount of consumables required by the first group of vehicles in doing so. For example, in the context of combat aircraft, the choice and sequence of actions are selected to minimize the use of weapons, fuel, and the loss of one or more vehicles from the first group of vehicles. These and other technological improvements to these control systems will become apparent upon further reading of this disclosure.

Various examples of systems, devices, and/or methods are described herein. Words such as "example" and "exemplary" that may be used herein are understood to mean "serving as an example, instance, or illustration." Any embodiment, implementation, and/or feature described herein as being an "example" or "exemplary" is not necessarily to be construed as preferred or advantageous over any other embodiment, implementation, and/or feature unless stated as such. Thus, other embodiments, implementations, and/or features may be utilized, and other changes may be made without departing from the scope of the subject matter presented herein.

Accordingly, the examples described herein are not meant to be limiting. It will be readily understood that the aspects of the subject disclosure, as generally described herein, and illustrated in the figures, can be arranged, substituted, combined, separated, and designed in a wide variety of different configurations.

Further, unless the context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Moreover, terms such as "substantially" or "about" that may be used herein, are meant that the recited characteristic, parameter, or value need not be achieved exactly, but that deviations or variations, including, for example, tolerances, measurement error, measurement accuracy limitations and other factors known to one skilled in the art, may occur in amounts that do not preclude the effect the characteristic was intended to provide.

Further, terms such as "includes," "including," "has," "contains," and variants thereof that may be used herein are intended to be inclusive in a manner similar to the term "comprises" as an open transition word without precluding any additional or other elements.

I. Introduction

As noted above, some autonomous control systems are rule-based. The rules specified in a rule-based system are typically specified by a human operator. Rule-based systems are somewhat inflexible and static. That is, they do not adapt to new scenarios. Further, the number of rules that need to be generated and stored can be unwieldy, thus consuming an exorbitant number of man-hours.

Examples of systems and methods for overcoming these and other issues are disclosed below. An example system utilizes machine-learning logic (MLL) to control a first group of vehicles to perform various actions to remove a second group of vehicles from an engagement zone. An example of the system receives observations from the first group of vehicles related to the engagement zone. Examples of the observations specify relative distances, speeds, heading, etc., between different vehicles of the engagement zone. Further examples of the observations specify environmental conditions (e.g., wind speed, temperature) related to the engagement zone. Other examples of the observations specify the capabilities of the vehicles. For example, in the context of combat aircraft, the observations specify the types of weapons on the aircraft, the amount of fuel, the field of view and range of sensors (sensor capability) on an aircraft, general aircraft maneuverability, such as turn rates, max G-loads, climb/descent rates, etc. These and other observations are described in further detail below.

The MLL of the system communicates actions to the first group of vehicles that increase the chances of removal of the second group of vehicles from the engagement zone. Examples of the actions instruct one or more of the first group of vehicles to move to particular headings, change speed, change attack angle, etc. In the context of combat aircraft, examples of the actions instruct one or more of the first group of vehicles to fire a weapon, follow a target vehicle, etc. These and other actions are described in further detail below The MLL of the system is trained using a reinforcement learning technique. In this regard, a simulator is configured with a first simulated group of vehicles and a second simulated group of vehicles. The first group of simulated vehicles and the second group of simulated vehicles are specified to correspond to the first group of vehicles and the second group of vehicles described above. At each timestep of the simulation, the simulator outputs observations associated with the first group of simulated vehicles to the MLL and receives actions from the MLL to be taken by the first group of simulated vehicles. At the end of a simulation run, the simulation outputs an indication of a reward to the MLL. The reward is utilized during training to update various weights of the MLL to reinforce those actions that led to indications of reward increases and to deemphasize those actions that led to an indication of a reward decrease.

FIG. 1 illustrates an example of an environment 100 in which a vehicle engagement control system (VECS) 102 operates. Illustrated in the figure are the VECS 102, a first group of vehicles 150, and second group of vehicles 152. Examples of the various entities of the environment 100 are configured to communicate with one another. In an example, the first group of vehicles 150 communicates with the VECS 102 via a wireless interface.

Referring to the figure, the first group of vehicles 150 and the second group of vehicles 152 operate within an engagement zone 140, such as a particular region over land, sea, etc. Examples of the first group of vehicles 150 and the second group of vehicles 152 correspond to aircraft such as airplanes, helicopters, etc. An example of an aircraft is a combat aircraft that includes weaponry and surveillance systems. An example of the aircraft includes sensors 155 that facilitate measuring and generating data related to the aircraft, such as the aircraft's elevation, airspeed, ground speed, position, velocity, acceleration, and/or heading. Examples of the sensors 155 facilitate measuring data related to the environment in which the aircraft operates, such as wind-related data, precipitation-related data, barometric pressure data, and/or visibility data.

The VECS 102 includes a memory 127, a processor 125, an input/output (I/O) subsystem 110, and machine learning logic (MLL) 115. Examples of the VECS 102 include other subsystems. As will be described in further detail below, the memory 127 stores instruction code that is executable by the processor 125 for causing the processor 125 to perform various operations alone or in cooperation with other subsystems of the VECS 102. These operations include receiving, by the MLL 115, observations 135 indicative of states associated with the first group of vehicles 150 and the second group of vehicles 152. As noted above, the first group of vehicles 150 and the second group of vehicles 152 operate within an engagement environment 140 during a first interval of an engagement between the first group of vehicles 150 and the second group of vehicles 152. The MLL 115 determines actions 133, based on the observations 135 that, when taken concurrently and/or simultaneously by the first group of vehicles 150 during the first interval, are predicted, by the MLL 115, to result in removal of one or more the second group of vehicles 152 from the engagement environment 140 during the engagement.

Examples of observations 135 received from the first group of vehicles 150 indicate relative differences in positions, velocities, accelerations, and/or headings between a target vehicle of the first group of vehicles 150 and other vehicles of the first and second groups of vehicles (150, 152). Further examples of observations 135 received from the first group of vehicles 150 indicate characteristics of the target vehicle that specify one or more of the target vehicle's field of view, minimum turn rate, maximum turn rate, current turn rate, climb rate, descent rate, linear and radial acceleration, number of projectiles carried, projectile types, and/or projectile characteristics.

Examples of actions 133 communicated to one or more of the first group of vehicles 150 instruct the vehicles of the first group of vehicles 150 to change a heading, speed, or altitude; move to a defined region of an engagement zone; follow another vehicle; and/or to evade another vehicle. In an example, information associated with the actions 133 is communicated to respective vehicle management or autopilot systems 160 of the first group of vehicles 150.

As described further below, the MLL 115 is trained using a reinforcement learning technique and on a plurality of simulated engagements between the first group of vehicles 150 and the second group of vehicles 152 to determine sequences of actions 133 that result in the removal of one or more of the second group of vehicles 152 from the engagement environment 140. The MLL 115 communicates the actions 133 to the first group of vehicles 150.

As noted above, the processor 125 is in communication with the memory 127. The processor 125 is configured to execute instruction code stored in the memory 127. The instruction code facilitates performing, by the VECS 102, various engagement related operations. In this regard, in an example, the instruction code causes the processor 125 to control and coordinate various activities performed by the different subsystems of the VECS 102. An example of the processor 125 corresponds to a stand-alone computer system such as an Intel®, AMD®, or ARM® based computer system or a different computer system and includes application-specific computer systems. An example of the computer system includes an operating system, such as Microsoft Windows®, Linux, Unix®, Mac OS®, or a different operating system.

An example of the I/O subsystem 110 includes one or more input, output, or input/output interfaces and is configured to facilitate secure communications with entities outside of the VECS 102. In this regard, an example of the I/O subsystem 110 is configured to wirelessly communicate actions 133 to the first group of vehicles 150 and to receive observations 132 associated with the sensors 155 of the first group of vehicles 150. Another example of the I/O subsystem 110 is configured to communicate with entities outside of the VECS 102 via a network, such as the Internet.

An example of the MLL 115 corresponds to hardware, software, or a combination thereof that is specifically configured to implement or assist in the implementation of various supervised and unsupervised machine learning models. An example of the MLL 115 implements a Holt-Winters algorithm, exponential time smoothing (ETS) algorithm, an artificial neural network (ANN), a recurrent neural network (RNN), a seasonal autoregressive moving average (SARIMA) algorithm, a network of long short-term memories (LSTM), and/or a gated recurring unit (GRU) algorithm. Examples of the MLL 115 implement other machine learning logic.

In some examples, one or more of the subsystems referenced herein correspond to a stand-alone computer system such as an Intel®, AMD®, or Arm® based computer system or a different computer system or an application-specific computer system. Examples of the computer systems include an operating system, such as Microsoft Windows®, Linux, Unix®, or another operating system. In some examples, one or more of the operations performed by the various subsystems above are combined into a fewer or greater number of subsystems to facilitate speed scaling, cost reductions, etc.

Figure 2:
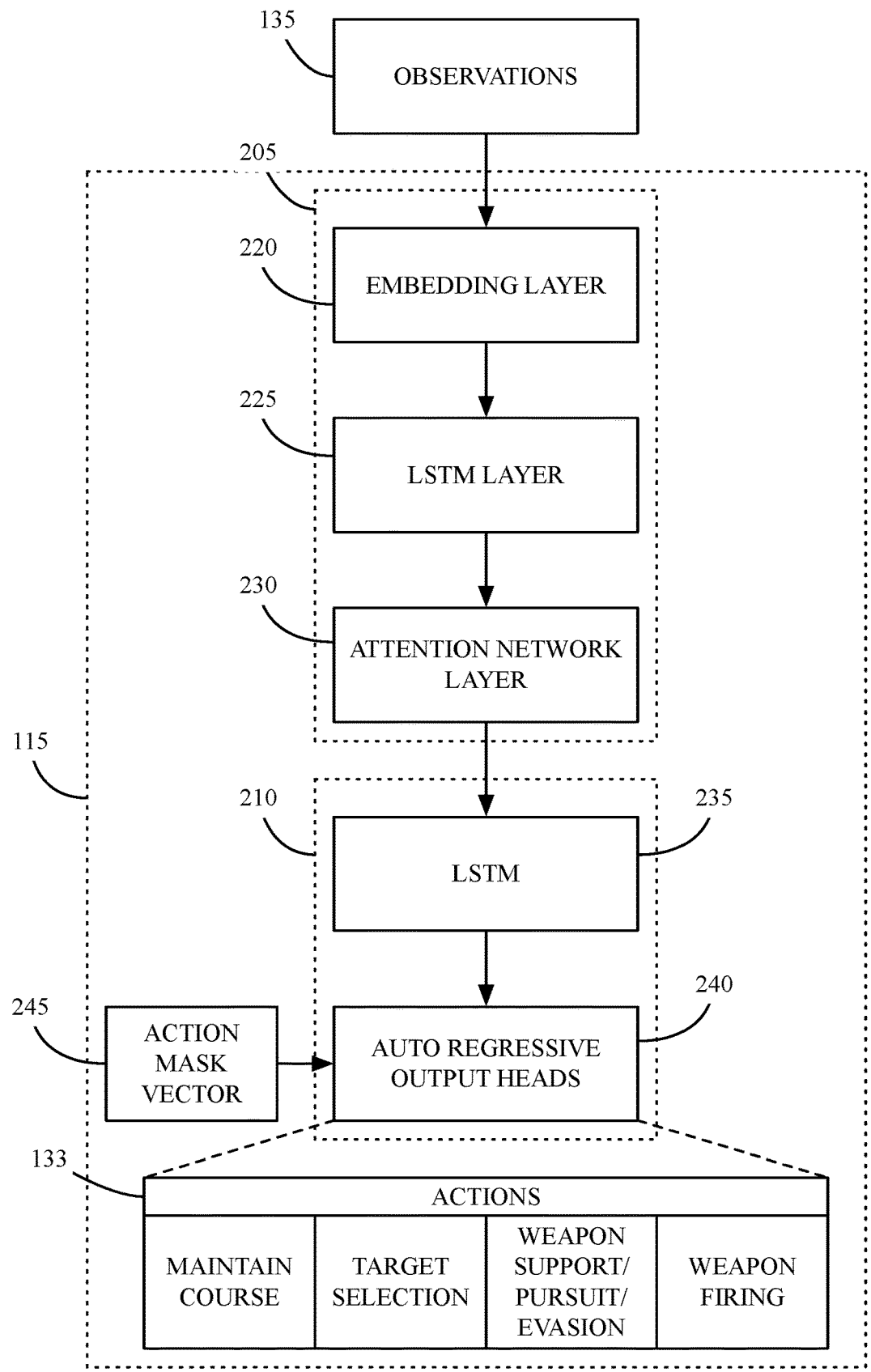
FIG. 2 illustrates machine learning logic (MLL) of the VECS, in accordance with an example.

FIG. 2 illustrates an example of the MLL 115. Referring to the figure, the MLL 115 includes encoder logic 205 and decoder logic 210. An example of the encoder logic 205 includes an embedding layer 220, an LSTM layer 225, and an attention network layer 230. The embedding layer 220 is configured to receive observations 135 and to output vectors to the LSTM layer 225 that are associated with the observations 135 and that represent the observations 135 in a dimensionally consistent manner. The LSTM layer 225 is configured to output further features associated with the observations 135 to the attention network layer 230. The attention network layer 230 is trained to deemphasize aspects related to certain observations 135 and to emphasize aspects related to other observations 135.

In an example, the size (e.g., number of input elements) of the embedding layer 220 and the LSTM layer 225 correspond to the number of observations 135 to be processed by the encoder logic 205. For example, the number of inputs equals twenty when there are twenty observations 135 available.

In an example, the observations 135 are updated (i.e., received from the first group of vehicles 150) and input into the encoder logic 205 periodically, such as every one second, ten seconds, one minute, etc. In an example, observations 135 simultaneously input into the encoder logic 205 at each time step indicate relative differences in positions, velocities, accelerations, and/or headings between a target vehicle of the first group of vehicles 150 and other vehicles of the first group of vehicles 150 and the second group of vehicles 152. Further examples of observations 135 simultaneously input into the encoder logic 205 at each time step indicate characteristics of the target vehicle that specify one or more of the target vehicle's field of view, minimum turn rate, maximum turn rate, current turn rate, climb rate, descent rate, linear and radial acceleration, number of projectiles carried, projectile types, and/or projectile characteristics.

In an example, the observations 135 described above are simultaneously (or substantially simultaneously) received from each of the first group of vehicles 150. Thus, in an example where there are ten observations 135 associated with each of ten vehicles, one hundred observations 135 are simultaneously inputted into the encoder logic 205 at each time step.

An example of the decoder logic 210 includes an LSTM layer 235 and an autoregressive output head 240. The LSTM layer 235 is configured to receive the output from the encoder logic 205 (i.e., the output of the attention network layer). An example of the autoregressive output head 240 corresponds to a fully connected layer and is configured to output a vector with elements for each possible action a vehicle of the first group of vehicles 150 can take. An example of the autoregressive output head 240 is further configured to receive an action mask vector 245. An example of the autoregressive head 240 facilitates that some actions be conditioned on other actions taken within the same timestep. For example, the manner in which the MLL 115 determines the heading, speed, and altitude for a particular vehicle of the first group of vehicles 150 is conditioned on the target vehicle selected for the particular vehicle. The action mask vector 245 is specified to prevent particular combinations of actions from being communicated to particular vehicles. By inputting the action mask vector 245 into the autoregressive output head 240, the actions 133 output from the autoregressive output head 240 will be limited to those allowed by the action mask vector 245.

Examples of actions 133 communicated by the decoder logic 210 to each of the first group of vehicles 150 include the assignment of a particular vehicle to a particular region of the engagement environment 140; the assignment of a particular vehicle to track another vehicle; instructing a particular vehicle to fire a weapon; instructing a particular vehicle to follow another vehicle at a particular offset distance, offset angle; instructing a particular vehicle to follow another vehicle at a particular cross-range, down-range, radial-tolerance; instructing a particular vehicle to evade another vehicle, instructing a particular vehicle to change heading, speed, and altitude.

Figure 3:
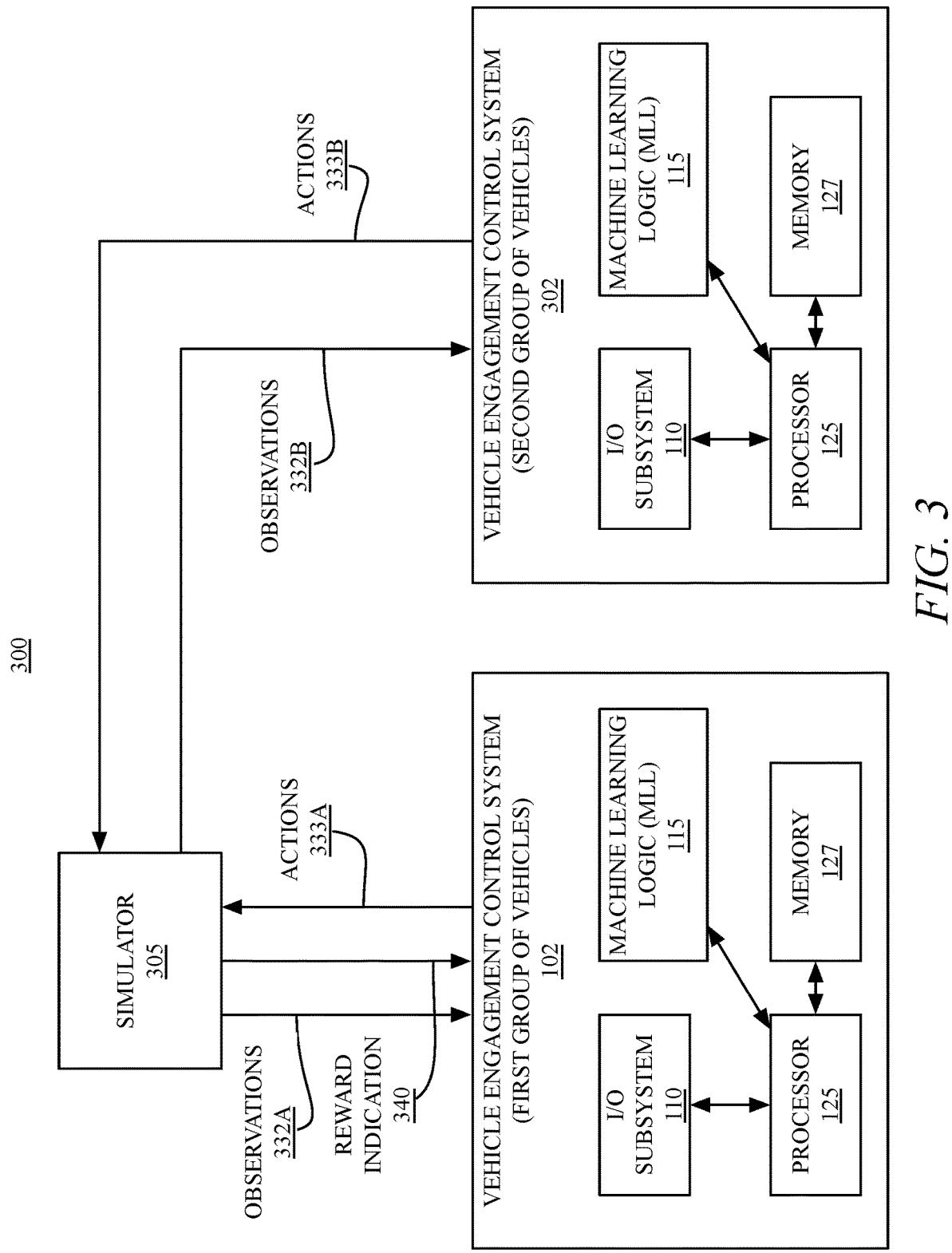
FIG. 3 illustrates an environment for training the VECS in accordance with an example.

FIG. 3 illustrates an example of an environment 100 for training the vehicle engagement control system (VECS) 102. Illustrated in the figure are the VECS 102 (described above), a second VECS 302, and a simulator 305. In an example, the first VECS 102 and the second VECS 302 communicate with the simulator 305 via a network, such as the Internet.

An example of the simulator 305 implements an engagement and mission level simulation environment such as the Advanced Framework for Simulation, Integration, and Modeling (AFSIM) simulation environment. An example of the simulator 305 is configured to simulate the actions of the first group of vehicles 150 and the second group of vehicles 152 while the vehicles operate within an engagement environment 140. In this regard, an example of the simulator 305 is configured with parameters that specify aspects related to each vehicle of a first group of simulated vehicles and the second group of simulated vehicles. In the context of combat aircraft, examples of these aspects relate to weapons (e.g., weapon type, weapon speed, weapon range, number of weapons), platform/aircraft capabilities (e.g., roll rate, maximum acceleration, turn rate, maximum radial acceleration, maximum speed, minimum speed), and/or sensors (e.g., the minimum and maximum azimuth and elevation field of view, the maximum distance of range sensor). Other aspects described within this disclosure can be specified.

An example, of the simulator 305 is configured to communicate observations 332A derived from/associated with information received from the first group of simulated vehicles to the first VECS 102 and to communicate observations 332B derived from/associated with information received from the second group of simulated vehicles to the second VECS 302. In an example where the vehicles correspond to combat aircraft, examples of these observations specify, for each of the first group of vehicles 150 and the second vehicles 152, the number of weapons of the vehicle; data associated with the field of view sensor and other sensors of the vehicle; the range, closure rate and closure speed of the vehicle relative to another vehicle; the weapon limits of the vehicle (e.g., maximum range time of flight, the minimum range of the weapons); and/or the number of weapons fired. Other observations 332 describe within this disclosure can be communicated from the simulator 305 to the first VECS 102 and the second VECS 302.

The simulator 305 is configured to receive actions (333A, 333B) from the first VECS 102 and the second VECS 302 and update aspects associated with the corresponding vehicles based on the actions (333A, 333B). Examples of actions (333A, 333B) communicated to the simulator 305, that are associated with each vehicle, include the assignment of a particular vehicle to a particular region of the engagement environment 140; the assignment of a particular vehicle to track another vehicle; instructing a particular vehicle to fire a weapon or multiple weapons (e.g., a specified salvo size with a delay between consecutive firing of weapons); instructing a particular vehicle to follow another vehicle at a particular offset distance and/or offset angle; instructing a particular vehicle to follow another vehicle at a particular cross-range, down-range, and/or radial-tolerance; instructing a particular vehicle to evade another vehicle; instructing a particular vehicle to change heading, speed, and altitude. Other actions (333A, 333B) described within this disclosure can be communicated to the simulator 305 from the first VECS 102 and the second VECS 302.

Figure 4A:
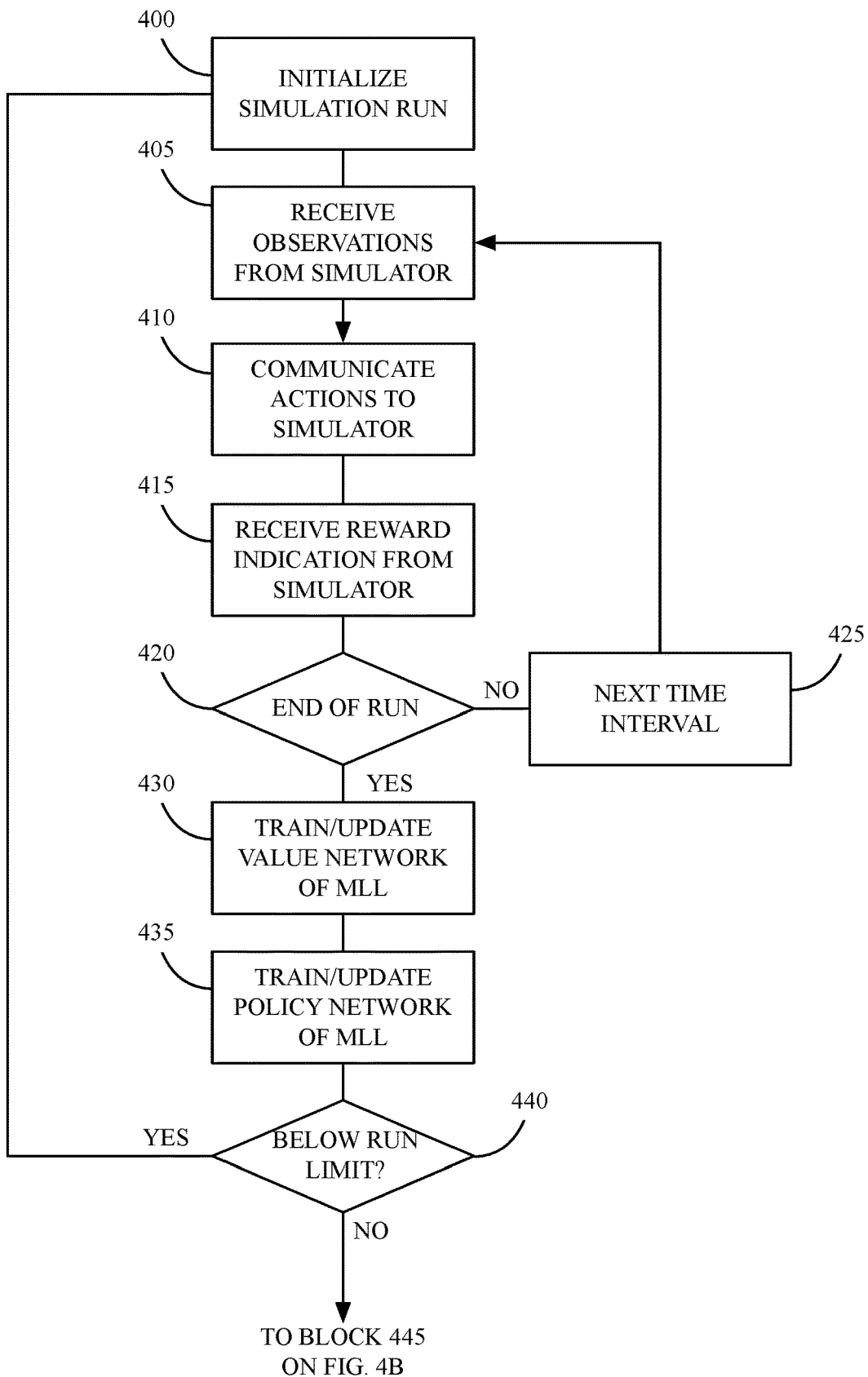
FIG. 4A and FIG. 4B illustrate operations performed by the VECS during training of the MLL, in accordance with an example.
Figure 4B:
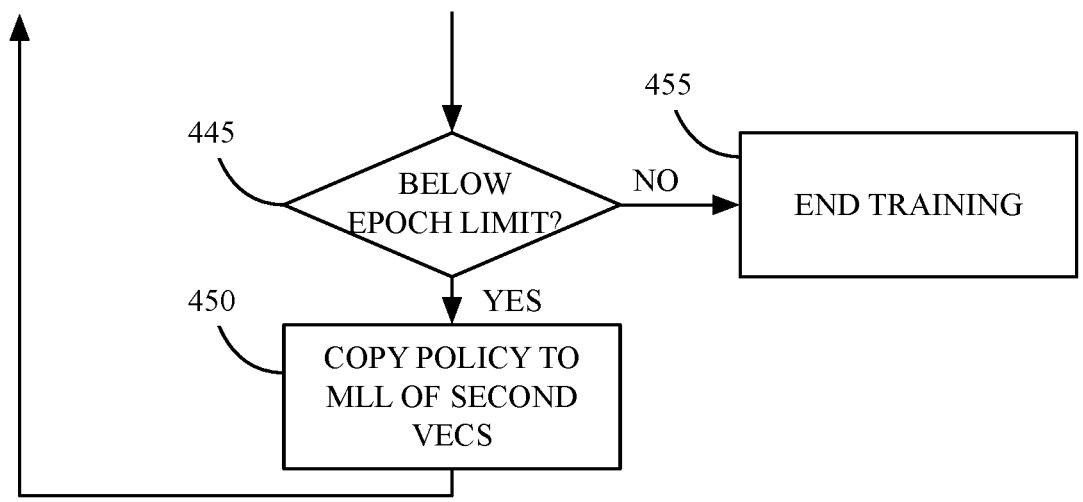

FIG. 4A and FIG. 4B illustrate examples of operations performed by the first VECS 102 during training of the MLL 115 of the first VECS 102. It should be understood that one or more of the operations can be implemented in instruction code that can be stored in the memory of the respective systems. The instruction code can be executed by one or more processors of these systems, alone or in combination with other subsystems of these systems, to cause the respective systems to perform the operations illustrated in the figures.

During each simulated run, the MLL 115 of the first VECS 102 is updated based on reinforcement learning to take actions that lead to winning results such as removal of one or more vehicles of the second group of vehicles from the engagement zone during the engagement. An example of removal can correspond to a vehicle leaving the engagement zone 140 under its own or pilots direction. Another example of removal can correspond to a vehicle being destroyed, crashing, and/or otherwise not being a threat to any of the first vehicle. In an example, after a particular number of engagements are completed, the policy learned for the first MLL 115 is copied to the MLL 115 of the second VECS 302. In an example, this process is repeated a number of times to improve the policy of the first MLL 115.

Referring to the figure, at block 400, the simulator 305 is initialized and started. For example, in a first instance, the MLL 115 of the first VECS 102 is initialized with a default policy. In an example, the directions and velocities of the first group of simulated vehicles and the second group of vehicles simulated vehicles are initialized to random values. In a further example, the positions of the first group of simulated vehicles and the second group of vehicles simulated vehicles are specified randomly within the engagement environment 140. After initialization, the simulator 305 is started.

At block 405, observations 332A are received from the simulator 305. Examples of the observation 332A received by the first VECS 102 are described above. As previously noted above, the simulator 305 is configured to output observations 332A derived from/associated with the first group of simulated vehicles at a particular interval (e.g., every second, ten seconds, every minute). Thus, in an example, observations 332A associated with the vehicles are received at a constant interval.

At block 410, actions 333A are communicated to the simulator 305. Examples of the actions 333A communicated from the first VECS 102 to the simulator 305 are described above. In an example, the MLL 115 processes the observations 332A and outputs actions 333A according to its policy. The actions correspond to those actions that, when simultaneously (or substantially simultaneously) taken/performed by the first group of simulated vehicles, are predicted by the MLL 115 to result in removal of one or more vehicles of the second group of vehicles will be removed from the engagement zone during the engagement. For example, the MLL 115 can determine that a probability of a removal of the one or more vehicles of the second group of vehicles from the engagement zone in response to one or more actions being performed by the one or more vehicles of the first group of vehicles, satisfies a defined high-probability criterion (e.g., is greater than a defined threshold).

In an example, a first action instructs a target vehicle of the first group of simulated vehicles to move to a particular region within the engagement zone 140. A second action instructs the target vehicle to fire a missile in a particular direction. The two actions are communicated in the same timestep of the simulation run to the simulator 305. The simulator 305, within the same timestep, responsively causes the simulated target vehicle to begin to move to the particular region within the engagement zone 140 and to fire the missile in the particular direction.

In a further example, a third action instructs a second target vehicle of the first group of simulated vehicles to pursue another vehicle (e.g., a vehicle of the second group of simulated vehicles). The first, second, and third actions are communicated in the same timestep of the simulation run to the simulator 305. Therefore, in addition to causing the first target vehicle to simultaneously (or substantially simultaneously) perform the first and second actions, the simulator 305 causes the second simulated target vehicle to simultaneously (or substantially simultaneously) perform the third action (i.e., to pursue the vehicle of the second group of simulated vehicles).

As will be appreciated, these actions are determined by the MLL 115 because the MLL 115, after training, determines that these actions result in the removal (or eventual removal) of one or more of the second group of simulated vehicles from the engagement zone 140. In some examples these actions are part of a sequence of actions communicated to one or more of the first group of simulated vehicles over successive time steps that, when performed, are predicted by the MLL 115 to result in the removal/or eventual removal of one or more of the second group of simulated vehicles from the engagement zone 140.

At block 415, a reward indication 340 is received from the simulator 305. In an example, a reward indication 340 associated with the first group of simulated vehicles is received from the simulator 305 after the run of the simulation when one or more of the second group of simulated vehicles is removed from the engagement zone 140. An example of removal can correspond to a vehicle leaving the engagement zone 140 under its own or pilots direction. Another example of removal can correspond to a vehicle being destroyed, crashing, and/or otherwise not being a threat to any of the first vehicle. In an example, the simulator 305 communicates a reward indication 340 associated with the actions 333A taken by the first group of simulated vehicles after each time step of the simulation. In an example, a penalty is indicated when a vehicle of the first group of simulated vehicles uses more than a threshold amount of fuel, launches a projectile at a target vehicle of the second group of vehicles, and/or launches a projectile at the target vehicle and misses. In another example, a reward is indicated when a vehicle of the first group of simulated vehicles provides assistance to another vehicle of the first group of simulated vehicles in removing a target vehicle (i.e., one of the second group of simulated vehicles) from the engagement zone 140, comes closer to the target vehicle, gets further away from the target vehicle, and/or detects the target vehicle within a field of view of a sensor of the first vehicle.

At block 420, if the simulation is not at the end of the run, then at block 425, the simulator 305 is advanced to the next time step. The operations then continue from block 405. In an example, the simulation run is determined to end when all of the vehicles of the second group of vehicles are removed from the engagement zone 140 or all of the first group of vehicles 152 are removed from the engagement zone 140.

At block 430, the value network implemented by the MLL 115 of the first VECS 102 is updated. In an example, updating the value network of the MLL 115 involves minimizing a value loss function. An example of the value loss function to minimize is:

$$L^{Value}(w) = \sum_t (V_w(s_t) - G_t)^2$$

where $G_t$ corresponds to the discounted cumulative reward and is given by the following equation:

$$G_t = \sum_{k=t+1}^{T} \gamma^k R_k$$

At block 435, the policy network implemented by the MLL 115 of the first VECS 102 is updated. In an example, updating the policy network of the MLL 115 involves minimizing a policy loss function. An example of the policy loss function to minimize is:

$$L^{Policy}(\theta) = -\sum_t \log(\pi_\theta(a_t|s_t))A_t$$

where $A_t$ corresponds to the advantage calculation and is given by the following equation:

$$A_t = G_t - V_w(s_t)$$

If at block 440, the number of runs is below a run limit threshold, then the operations from block 400 repeat. The run limit corresponds to the number of times to run the simulation before updating the MLL 115 of the second VECS 302. In an example, the run limit is set to ten to facilitate ten simulation runs before updating the MLL 115 of the second VECS 302.

If at block 440 the number of runs reaches the run limit, and at block 445, the number of epochs run is below an epoch limit, then at block 450, the policy of the MLL 115 of the second VECS 302 is set to the policy of the MLL 115 of the first VECS 102. The operations then repeat from block 400. In an example, the epoch limit is set to ten. However, other limits can be specified. Generally, the capabilities of the MLL 115 of the first VECS 102 improve as the number of epochs is increased.

If at block 445, the number of epochs reaches the epoch limit, then at block 455, the training operations end.

Figure 5:
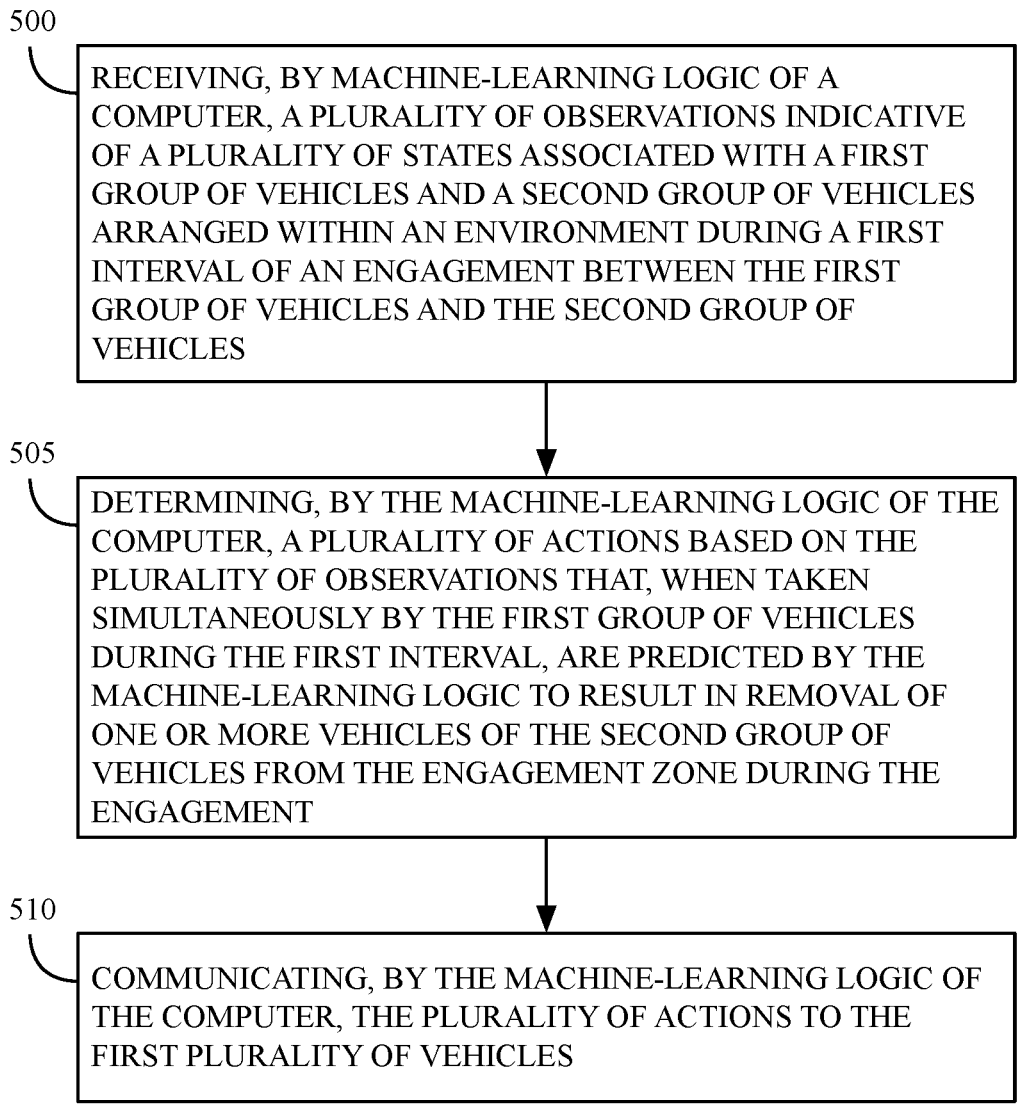
FIG. 5 illustrates a computer-implemented method performed by one or more of the systems described above, in accordance with an example.

FIG. 5 illustrates an example of a method implemented by a computing system that can be performed by one or more of the examples described above.

Block 500 involves receiving, by machine-learning logic of a computer, a plurality of observations indicative of a plurality of states associated with a first group of vehicles and a second group of vehicles arranged within an environment during a first interval of an engagement between the first group of vehicles and the second group of vehicles.

Block 505 involves determining, by the machine-learning logic of the computer, a plurality of actions based on the plurality of observations that, when taken simultaneously (or substantially simultaneously) by the first group of vehicles during the first interval, are predicted by the machine-learning logic to result in removal of one or more vehicles of the second group of vehicles from the environment during the engagement. The machine-learning logic is trained using a reinforcement learning technique and on a plurality of simulated engagements between the first group of vehicles and the second group of vehicles to determine sequences of actions that result in the one or more vehicles of the second group of vehicles being removed from the environment.

Block 510 involves communicating, by the machine-learning logic of the computer, the plurality of actions to the first group of vehicles.

In an example, each action of the plurality of actions is associated with a particular vehicle of the first plurality vehicles. In this example, communicating the plurality of actions to the first group of vehicles involves communicating each of the plurality of actions to an associated vehicle of the first plurality vehicles.

An example involves training the machine-learning logic with a simulator 305 configured to simulate the first group of vehicles and the second group of vehicles. During training, this example involves receiving, by the machine-learning logic, the plurality of observations indicative of the plurality of states from the simulator 305 during a first timestep of a run of the simulator 305. This example further involves subsequently communicating, by the machine-learning logic, the plurality of actions to the simulator 305. The first group of vehicles simulated by the simulator 305 subsequently perform the plurality of actions. This example further involves receiving, from the simulator 305 and after the run of the simulation, an indication of a reward associated with the first group of vehicles when the one or more vehicles of the second group of vehicles are removed from the environment.

An example involves receiving, from the simulator 305 and after each time step of the run of the simulation, an indication of a penalty or a reward. A penalty is indicated when a first vehicle of the first group of vehicles uses more than a threshold amount of fuel, launches a projectile at a target vehicle of the second group of vehicles, or launches a projectile at the target vehicle and misses. A reward is indicated when the first vehicle provides assistance to another vehicle of the first group of vehicles in removing the target vehicle from the environment, comes closer to the target vehicle, gets further away from the target vehicle, and detects the target vehicle within a field of view of a sensor of the first vehicle.

In an example, the machine-learning logic includes a policy network. This example involves training the policy network using a reinforcement learning technique that configures aspects of the policy network to output a plurality of actions, based on a plurality of observations, by minimizing a policy loss function.

In an example, the machine-learning logic includes a value network. This example involves training the value network using a reinforcement learning technique that configures aspects of the value network to output a value for each of the plurality of states, based on the plurality of observations and the plurality of actions, by minimizing a value loss function, wherein the policy loss function is a function of the value loss function.

In an example, the policy network includes encoder logic 205 and decoder logic 210. This example involves receiving, by the machine-learning logic, the plurality of observations comprises receiving, by the encoder logic 205 of the policy network, the plurality of observations by the encoder logic 205 of the policy network; and communicating, by the machine-learning logic, the plurality of actions comprises communicating, by the decoder logic 210 of the policy network, the plurality of actions.

In an example, the encoder logic 205 comprises an attention network. This example involves emphasizing, by the attention network and to the decoder logic 210, a subset of the plurality of observations that are relevant to a particular state of the encoder logic 205.

In an example, receiving, by the encoder logic 205 of the policy network, the plurality of observations involves receiving, by a bi-directional long-short-term memory (LSTM) layer of the encoder logic 205, the plurality of observations.

In an example, receiving the plurality of observations involves receiving, by the encoder logic 205, a number of observations that match a number of inputs of the encoder logic 205.

In an example, communicating the plurality of actions by the decoder logic 210 involves communicating, by the decoder logic 210, a number of actions that match a number of outputs of the decoder logic 210.

An example involves masking the outputs of the decoder logic 210 to prevent particular combinations of actions from being communicated to particular vehicles.

An example involves specifying at least a subset of the plurality of observations to indicate i) relative differences in positions, velocities, accelerations, or headings between a target vehicle and other vehicles of the first group of vehicles and the second group of vehicles, and ii) characteristics of the target vehicle that specify one or more of the target vehicle's: field of view, minimum turn rate, maximum turn rate, current turn rate, climb rate, descent rate, linear and radial acceleration, number of projectiles carried, projectile types, and projectile characteristics.

An example involves specifying at least a subset of the plurality of actions to control a target vehicle to change a heading, speed, or altitude; move to a region of an environment; follow another vehicle; or to evade another vehicle.

An example involves deriving at least some of the plurality of observations from sensors of the first group of vehicles; and communicating information associated with the plurality of actions to respective vehicle management or autopilot systems of the first group of vehicles.

Figure 6:
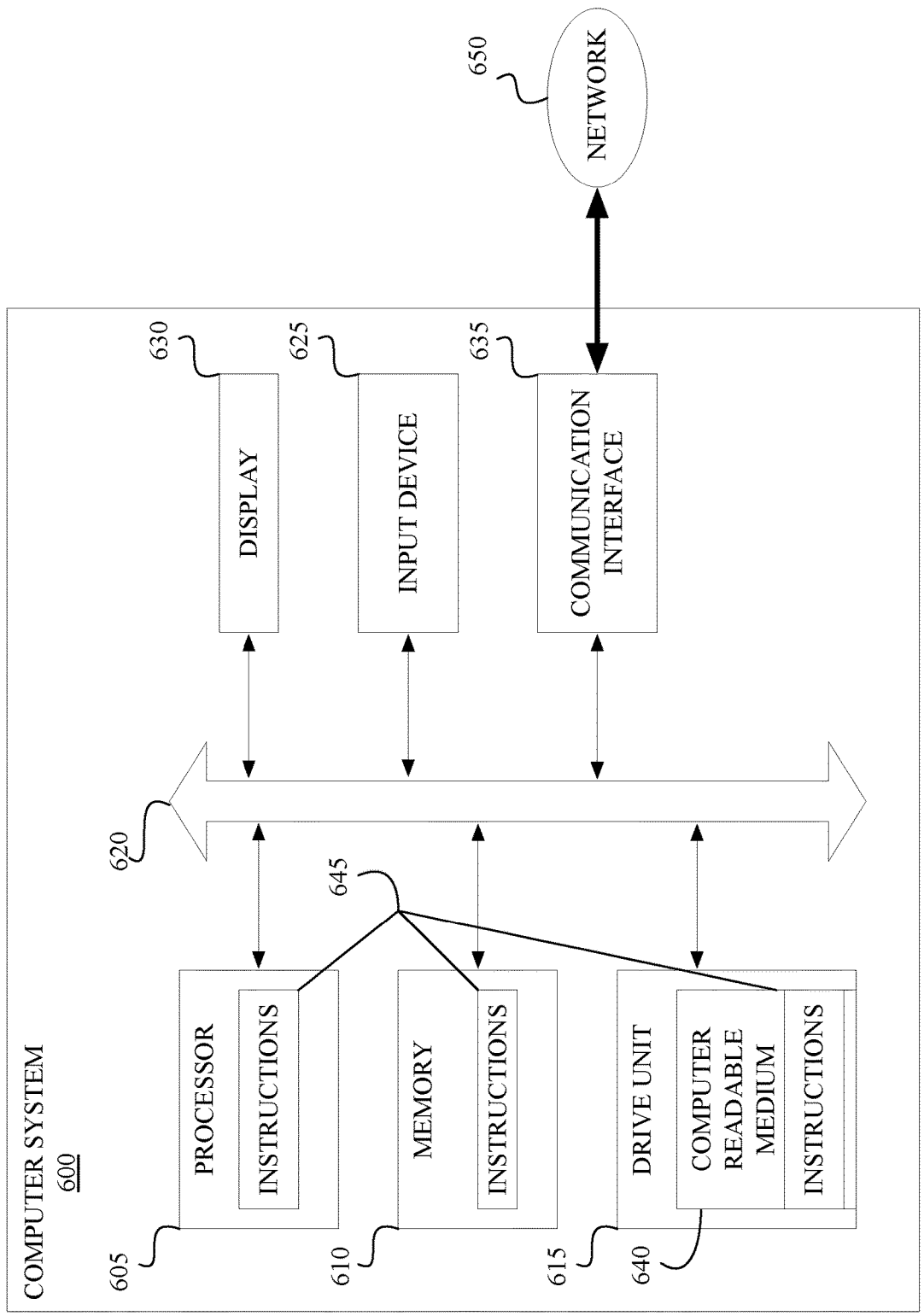
FIG. 6 illustrates a computer system that forms part and/or implements one or more of the systems or devices of the environment, in accordance with an example.

FIG. 6 illustrates an example of a computer system 600 that can form part of or implement any of the systems and/or devices described above. An example of the computer system 600 includes a set of instructions 645 that the processor 605 executes to cause the computer system 600 to perform any of the operations described above. An example of the computer system 600 operates as a stand-alone device or is connected, e.g., using a network, to other computer systems or peripheral devices.

In a networked example, an example of the computer system 600 operates in the capacity of a server or as a client computer in a server-client network environment, or as a peer computer system in a peer-to-peer (or distributed) environment. An example of the computer system 600 is implemented as or incorporated into various devices, such as a personal computer or a mobile device, capable of executing instructions 645 (sequential or otherwise), causing a device to perform one or more actions. Further, in some examples, each of the systems described includes a collection of subsystems that individually or jointly execute a set, or multiple sets, of instructions to perform one or more computer operations.

An example of the computer system 600 includes one or more memory devices 610 communicatively coupled to a bus 620 for communicating information. In an example, code operable to cause the computer system to perform operations described above is stored in the memory 610. An example of the memory 610 is a random-access memory, read-only memory, programmable memory, hard disk drive, or any other type of memory or storage device.

An example of the computer system 600 includes a display 630, such as a liquid crystal display (LCD), a cathode ray tube (CRT), or any other display suitable for conveying information. An example of the display 630 acts as an interface for the user to see processing results produced by processor 605.

Additionally, an example of the computer system 600 includes an input device 625, such as a keyboard or mouse or touchscreen, configured to allow a user to interact with components of system 600.

An example of the computer system 600 includes a disk or optical drive unit 615. An example of the drive unit 615 includes a computer-readable medium 640 in which the instructions 645 are stored. An example of the instructions 645 resides completely, or at least partially, within the memory 610 and/or within the processor 605 during execution by the computer system 600. An example of the memory 610 and the processor 605 include computer-readable media as discussed above.

An example of the computer system 600 includes a communication interface 635 to support communications via a network 650. An example of the network 650 includes wired networks, wireless networks, or combinations thereof. An example of the communication interface 635 enables communications via any number of communication standards, such as 802.11, 802.12, 802.20, WiMAX, cellular telephone standards, or other communication standards.

Further, the disclosure comprises embodiments according to the following clauses:

Clause 1. A method implemented by a computing system, the method comprising: receiving, by machine-learning logic of a vehicle engagement control system (VECS), observation data indicative of a one or more states associated with a first group of vehicles and a second group of vehicles arranged within an engagement zone during a defined interval of an engagement between the first group of vehicles and the second group of vehicles; determining, by the machine-learning logic of the VECS, a plurality of actions based on the observation data that, when performed by the first group of vehicles, are predicted by the machine-learning logic to result in removal of one or more vehicles of the second group of vehicles from the engagement zone during the engagement, wherein the machine-learning logic is trained using a reinforcement learning technique and on a plurality of simulated engagements between the first group of vehicles and the second group of vehicles to determine sequences of actions that are predicted to result in the one or more vehicles of the second group of vehicles being removed from the engagement zone; and communicating, by the machine-learning logic of the VECS, the plurality of actions to at least a portion of the first group of vehicles.

Clause 2. The method according to clause 1, wherein each action of the plurality of actions is associated with a particular vehicle of the first group of vehicles, and wherein the communicating the plurality of actions to at least the portion of the first group of vehicles comprises: communicating each of the plurality of actions to an associated vehicle of at least the portion of the first group of vehicles.

Clause 3. The method according to any of the preceding clauses, further comprising: training the machine-learning logic with a simulator configured to simulate the first group of vehicles and the second group of vehicles, wherein during the training, the method comprises: receiving, by the machine-learning logic, simulated observation data from the simulator during a first timestep of a run of the simulator; subsequently communicating, by the machine-learning logic, the plurality of actions to the simulator, wherein the first group of vehicles simulated by the simulator subsequently perform the plurality of actions; and receiving, from the simulator and after the run of a simulation, a reward indication associated with the first group of vehicles in response to a determination that the one or more vehicles of the second group of vehicles have been removed from the engagement zone.

Clause 4. The method according to any of the preceding clauses, further comprising: receiving, from the simulator and after each time step of the run of the simulation, an indication of a penalty or a reward, wherein the penalty is indicated in response to a first determination that a first vehicle of the first group of vehicles at least one of uses more than a threshold amount of fuel, launches a projectile at a target vehicle of the second group of vehicles, or launches the projectile at the target vehicle and misses, and wherein the reward is indicated in response to a first determination that the first vehicle at least one of provides assistance to another vehicle of the first group of vehicles in removing the target vehicle from the engagement zone, comes closer to the target vehicle, gets further away from the target vehicle, and detects the target vehicle within a field of view of a sensor of the first vehicle.

Clause 5. The method according to any of the preceding clauses, wherein the machine-learning logic comprises a policy network, and wherein the method further comprises: training the policy network using the reinforcement learning technique that configures aspects of the policy network to output a plurality of actions, based on a plurality of observations, by minimizing a policy loss function.

Clause 6. The method according to any of the preceding clauses, wherein the machine-learning logic comprises a value network, the reinforcement learning technique is a first reinforcement learning technique, and wherein the method comprises: training the value network using a second reinforcement learning technique that configures aspects of the value network to output a value for each of the one or more states, based on the plurality of observations and the plurality of actions, by minimizing a value loss function, wherein the policy loss function is a function of the value loss function.

Clause 7. The method according to any of the preceding clauses, wherein the policy network comprises encoder logic and decoder logic, and wherein: the receiving, by the machine-learning logic, the observation data comprises receiving, by the encoder logic of the policy network, the observation data; and the communicating, by the machine-learning logic, the plurality of actions comprises communicating, by the decoder logic of the policy network, the plurality of actions.

Clause 8. The method according to any of the preceding clauses, wherein the encoder logic comprises an attention network layer, and wherein the method comprises: emphasizing, by the attention network layer and to the decoder logic, a subset of the plurality of observations that are relevant to a particular state of the encoder logic.

Clause 9. The method according to any of the preceding clauses, wherein the receiving, by the encoder logic of the policy network, the plurality of observations comprises:
receiving, by a bi-directional long-short-term memory (LSTM) layer of the encoder logic, the observation data.

Clause 10. The method according to any of the preceding clauses, wherein the receiving the observation data comprises receiving, by the encoder logic, a number of observations that match a number of inputs of the encoder logic.

Clause 11. The method according to any of the preceding clauses, wherein the communicating the plurality of actions by the decoder logic comprises communicating, by the decoder logic, a number of actions that match a number of outputs of the decoder logic.

Clause 12. The method according to any of the preceding clauses, further comprising masking the outputs of the decoder logic to prevent particular combinations of actions from being communicated to particular vehicles.

Clause 13. The method according to any of the preceding clauses, further comprising: specifying at least a set of the observation data to indicate at least one of i) relative differences in at least one of positions, velocities, accelerations, or headings between a target vehicle and other vehicles of the first group of vehicles and the second group of vehicles, or ii) characteristics of the target vehicle that specify one or more of the target vehicle's: field of view, minimum turn rate, maximum turn rate, current turn rate, climb rate, descent rate, linear and radial acceleration, number of projectiles carried, projectile types, or projectile characteristics.

Clause 14. The method according to any of the preceding clauses, further comprising specifying at least a set of the plurality of actions to control a target vehicle to at least one of: change a heading, speed, or altitude; move to a region of the engagement zone; follow another vehicle; or to evade another vehicle.

Clause 15. The method according to any of the preceding clauses, further comprising:
deriving at least some of the observation data from sensors of the first group of vehicles; and communicating information associated with the plurality of actions to respective vehicle management or autopilot systems of the first group of vehicles.

Clause 16. A system comprising: a memory that stores instruction code; and a processor in communication with the memory, wherein the instruction code is executable by the processor to perform operations comprising: receiving, by machine-learning logic implemented by the instruction code, observation data indicative of one or more states associated with a first group of vehicles and a second group of vehicles arranged within an engagement zone during a defined interval of an engagement between the first group of vehicles and the second group of vehicles; determining, by the machine-learning logic, a plurality of actions based on the observation data that, when performed simultaneously by the first group of vehicles during the first interval, are predicted by the machine-learning logic to result in removal of one or more vehicles of the second group of vehicles from the engagement zone during the engagement, wherein the machine-learning logic is trained using a reinforcement learning technique and on a plurality of simulated engagements between the first group of vehicles and the second group of vehicles to determine sequences of actions that are predicted to result in the one or more vehicles of the second group of vehicles being removed from the engagement zone; and communicating, by the machine-learning logic, the plurality of actions to at least a portion of the first group of vehicles.

Clause 17. The system according to clause 16, wherein each action of the plurality of actions is associated with a particular vehicle of the first group of vehicles, and wherein the in communicating the plurality of actions to at least the portion of the first group of vehicles, the instruction code is executable by the processor to perform operations comprising: communicating each of the plurality of actions to an associated vehicle of at least the portion of the first group of vehicles.

Clause 18. The system according to any of the preceding clauses, wherein the instruction code is executable by the processor to perform further operations comprising: training the machine-learning logic with a simulator configured to simulate the first group of vehicles and the second group of vehicles, wherein during the training, the instruction code is executable by the processor to perform further operations comprising: receiving, by the machine-learning logic, the plurality of observations indicative of the plurality of states from the simulator during a first timestep of a run of the simulator; subsequently communicating, by the machine-learning logic, the plurality of actions to the simulator, wherein the first group of vehicles simulated by the simulator subsequently perform the plurality of actions; and receiving, from the simulator and after the run of the simulation, an indication of a reward associated with the first group of vehicles, wherein the machine-learning logic comprises a policy network and a value network, wherein the instruction code is executable by the processor to perform further operations comprising: training the policy network using a first reinforcement learning technique that configures aspects of the policy network to output a plurality of actions, based on a plurality of observations, by minimizing a policy loss function; and training the value network using a second reinforcement learning technique that configures aspects of the value network to output a value for each of the plurality of states, based on the plurality of observations and the plurality of actions, by minimizing a value loss function, wherein the policy loss function is a function of the value loss function.

Clause 19. A non-transitory computer-readable medium having stored thereon instruction code, wherein the instruction code is executable by a processor of a computer system to perform operations comprising: receiving, by machine-learning logic implemented by the instruction code, observation data indicative of one or more states associated with a first group of vehicles and a second group of vehicles arranged within an engagement zone during a defined interval of an engagement between the first group of vehicles and the second group of vehicles; determining, by the machine-learning logic, a plurality of actions based on the observation data that, when performed by the first group of vehicles during the first interval, are predicted by the machine-learning logic to result in removal of one or more vehicles of the second group of vehicles from the engagement zone during the engagement, wherein the machine-learning logic is trained using a reinforcement learning technique and on a plurality of simulated engagements between the first group of vehicles and the second group of vehicles to determine sequences of actions that are predicted to result in the one or more vehicles of the second group of vehicles being removed from the engagement zone; and directing, by the machine-learning logic, action data indicative of the plurality of actions to the first group of vehicles.

Clause 20. The non-transitory computer-readable medium according to clause 19, wherein the instruction code is executable by the processor to perform further operations comprising: training the machine-learning logic with a simulator configured to simulate the first group of vehicles and the second group of vehicles, wherein during the training, the instruction code is executable by the processor to perform further operations comprising: receiving, by the machine-learning logic, the plurality of observations indicative of the plurality of states from the simulator during a first timestep of a run of the simulator; subsequently communicating, by the machine-learning logic, the plurality of actions to the simulator, wherein the first group of vehicles simulated by the simulator subsequently perform the plurality of actions; and receiving, from the simulator and after the run of the simulation, an indication of a reward associated with the first group of vehicles, wherein the machine-learning logic comprises a policy network and a value network, wherein the instruction code is executable by the processor to perform further operations comprising: training the policy network using a first reinforcement learning technique that configures aspects of the policy network to output a plurality of actions, based on a plurality of observations, by minimizing a policy loss function; and training the value network using a second reinforcement learning technique that configures aspects of the value network to output a value for each of the plurality of states, based on the plurality of observations and the plurality of actions, by minimizing a value loss function, wherein the policy loss function is a function of the value loss function.

Accordingly, examples of methods and systems described herein are realizable in hardware, software, or a combination of hardware and software. Examples of the methods and systems are realizable in a centralized fashion in at least one computer system or in a distributed fashion where different elements are spread across interconnected computer systems. Any kind of computer system or other apparatus adapted for carrying out the methods described herein can be employed.

The methods and systems described herein can also be embedded in a computer program product, which includes all the features enabling the implementation of the operations described herein and which, when loaded in a computer system, can carry out these operations. Computer program as used herein refers to an expression, in a machine-executable language, code or notation, of a set of machine-executable instructions intended to cause a device to perform a particular function, either directly or after one or more of a) conversion of a first language, code, or notation to another language, code, or notation; and b) reproduction of a first language, code, or notation.

While the systems and methods of operation have been described with reference to certain examples, it will be understood by those skilled in the art that various changes can be made and equivalents can be substituted without departing from the scope of the claims. Therefore, it is intended that the present methods and systems not be limited to the particular examples disclosed, but that the disclosed methods and systems include all embodiments falling within the scope of the appended claims.

The invention claimed is:

1. A method implemented by a computing system, the method comprising:
    training machine-learning logic of a vehicle engagement control system (VECS) with a simulator configured to simulate a first group of vehicles and a second group of vehicles arranged within an engagement zone, wherein during the training, the method comprises:
        receiving, by the machine-learning logic, simulated observation data from the simulator during a timestep of a run of the simulator;
        subsequently communicating, by the machine-learning logic, a plurality of actions to the simulator, wherein the first group of vehicles simulated by the simulator subsequently perform the plurality of actions; and
        receiving, from the simulator and after the run of the simulation, a reward indication associated with the first group of vehicles in response to a determination that the one or more vehicles of the second group of vehicles have been removed from the engagement zone;
    receiving, by the machine-learning logic of the VECS, observation data indicative of a one or more states associated with the first group of vehicles and the second group of vehicles during a defined interval of an engagement between the first group of vehicles and the second group of vehicles;
    determining, by the machine-learning logic of the VECS, the plurality of actions based on the observation data that, when performed by the first group of vehicles, are predicted by the machine-learning logic to result in removal of one or more vehicles of the second group of vehicles from the engagement zone during the engagement, wherein the machine-learning logic is trained using a reinforcement learning technique and on a plurality of simulated engagements between the first group of vehicles and the second group of vehicles to determine sequences of the plurality of actions that are predicted to result in the one or more vehicles of the second group of vehicles being removed from the engagement zone; and communicating, by the machine-learning logic of the VECS, the plurality of actions to at least a portion of the first group of vehicles.

2. The method according to claim 1, wherein each action of the plurality of actions is associated with a particular vehicle of the first group of vehicles, and wherein the communicating the plurality of actions to at least the portion of the first group of vehicles comprises:

communicating each of the plurality of actions to the particular vehicle of at least the portion of the first group of vehicles.

3. The method according to claim 1, further comprising:

receiving, from the simulator and after each time step of a plurality of timesteps of the run of the simulation, an indication of a penalty or a reward, wherein the penalty is indicated in response to a first determination that a first vehicle of the first group of vehicles at least one of uses more than a threshold amount of fuel, launches a projectile at a target vehicle of the second group of vehicles, or launches the projectile at the target vehicle and misses, and wherein the reward is indicated in response to a second determination that the first vehicle at least one of provides assistance to another vehicle of the first group of vehicles in removing the target vehicle from the engagement zone, comes closer to the target vehicle, gets further away from the target vehicle, and detects the target vehicle within a field of view of a sensor of the first vehicle.

4. The method according to claim 1, wherein the machine-learning logic comprises a policy network, and wherein the method further comprises:

training the policy network using the reinforcement learning technique that configures aspects of the policy network to output the plurality of actions, based on a plurality of observations, by minimizing a policy loss function.

5. The method according to claim 4, wherein the machine-learning logic comprises a value network, the reinforcement learning technique is a first reinforcement learning technique, and wherein the method comprises:

training the value network using a second reinforcement learning technique that configures aspects of the value network to output a value for each of the one or more states, based on the plurality of observations and the plurality of actions, by minimizing a value loss function, wherein the policy loss function is a function of the value loss function.

6. The method according to claim 4, wherein the policy network comprises encoder logic and decoder logic, and wherein:

the receiving, by the machine-learning logic, the observation data comprises receiving, by the encoder logic of the policy network, the observation data; and the communicating, by the machine-learning logic, the plurality of actions comprises communicating, by the decoder logic of the policy network, the plurality of actions.

7. The method according to claim 6, wherein the encoder logic comprises an attention network layer, and wherein the method comprises:

emphasizing, by the attention network layer and to the decoder logic, a subset of the plurality of observations that are relevant to a particular state of the encoder logic.

8. The method according to claim 6, wherein the receiving, by the encoder logic of the policy network, the plurality of observations comprises:

receiving, by a bi-directional long-short-term memory (LSTM) layer of the encoder logic, the observation data.

9. The method according to claim 6, wherein the receiving the observation data comprises:

receiving, by the encoder logic, a number of observations that match a number of inputs of the encoder logic.

10. The method according to claim 6, wherein the communicating the plurality of actions by the decoder logic comprises:

communicating, by the decoder logic, a number of actions that match a number of outputs of the decoder logic.

11. The method according to claim 10, further comprising:

masking the outputs of the decoder logic to prevent particular combinations of actions from being communicated to particular vehicles.

12. The method according to claim 1, further comprising:

specifying at least a set of the observation data to indicate at least one of i) relative differences in at least one of positions, velocities, accelerations, or headings between a target vehicle of the first group of vehicles or the second group of vehicles and other vehicles of the first group of vehicles and the second group of vehicles, or ii) characteristics of the target vehicle that specify one or more of the target vehicle's: field of view, minimum turn rate, maximum turn rate, current turn rate, climb rate, descent rate, linear and radial acceleration, number of projectiles carried, projectile types, or projectile characteristics.

13. The method according to claim 1, further comprising:

specifying at least a set of the plurality of actions to control a target vehicle of the first group of vehicles or the second group of vehicles to at least one of: change a heading, speed, or altitude; move to a region of the engagement zone; follow another vehicle of the first group of vehicles or the second group of vehicles; or to evade another vehicle of the first group of vehicles or the second group of vehicles.

14. The method according to claim 1, further comprising:

deriving at least some of the observation data from sensors of the first group of vehicles; and communicating information associated with the plurality of actions to respective vehicle management or autopilot systems of the first group of vehicles.

15. A system comprising:

a memory that stores instruction code; and a processor in communication with the memory, wherein the instruction code is executable by the processor to perform operations comprising:

training machine-learning logic implemented by the instruction code with a simulator configured to simulate a first group of vehicles and a second group of vehicles arranged within an engagement zone, wherein during the training, the instruction code is executable by the processor to perform further operations comprising:

receiving, by the machine-learning logic, simulated observation data from the simulator during a timestep of a run of the simulator;

subsequently communicating, by the machine-learning logic, a plurality of actions to the simulator, wherein the first group of vehicles simulated by the simulator subsequently perform the plurality of actions; and receiving, from the simulator and after the run of the simulation, an indication of a reward associated with the first group of vehicles in response to a determination that the one or more vehicles of the second group of vehicles have been removed from the engagement zone;

receiving, by the machine-learning logic implemented by the instruction code, observation data indicative of one or more states associated with the first group of vehicles and the second group of vehicles during a defined interval of an engagement between the first group of vehicles and the second group of vehicles;

determining, by the machine-learning logic, the plurality of actions based on the observation data that, when performed simultaneously by the first group of vehicles during the first interval, are predicted by the machine-learning logic to result in removal of one or more vehicles of the second group of vehicles from the engagement zone during the engagement, wherein the machine-learning logic is trained using a reinforcement learning technique and on a plurality of simulated engagements between the first group of vehicles and the second group of vehicles to determine sequences of the plurality of actions that are predicted to result in the one or more vehicles of the second group of vehicles being removed from the engagement zone; and communicating, by the machine-learning logic, the plurality of actions to at least a portion of the first group of vehicles.

16. The system according to claim 15, wherein each action of the plurality of actions is associated with a particular vehicle of the first group of vehicles, and wherein the in communicating the plurality of actions to at least the portion of the first group of vehicles, the instruction code is executable by the processor to perform operations comprising:

communicating each of the plurality of actions to the particular vehicle of at least the portion of the first group of vehicles.

17. The system according to claim 15,
wherein the machine-learning logic comprises a policy network and a value network, wherein the instruction code is executable by the processor to perform further operations comprising:

training the policy network using a first reinforcement learning technique that configures aspects of the policy network to output the plurality of actions, based on a plurality of observations, by minimizing a policy loss function; and training the value network using a second reinforcement learning technique that configures aspects of the value network to output a value for each of the plurality of states, based on the plurality of observations and the plurality of actions, by minimizing a value loss function, wherein the policy loss function is a function of the value loss function.

18. A non-transitory computer-readable medium having stored thereon instruction code, wherein the instruction code is executable by a processor of a computer system to perform operations comprising:

training machine-learning logic implemented by the instruction code with a simulator configured to simulate a first group of vehicles and a second group of vehicles arranged within an engagement zone, wherein during the training, the instruction code is executable by the processor to perform further operations comprising:

receiving, by the machine-learning logic, simulated observation data from the simulator during a timestep of a run of the simulator;

subsequently communicating, by the machine-learning logic, a plurality of actions to the simulator, wherein the first group of vehicles simulated by the simulator subsequently perform the plurality of actions; and receiving, from the simulator and after the run of the simulation, an indication of a reward associated with the first group of vehicles in response to a determination that the one or more vehicles of the second group of vehicles have been removed from the engagement zone;

receiving, by the machine-learning logic implemented by the instruction code, observation data indicative of one or more states associated with the first group of vehicles and the second group of vehicles during a defined interval of an engagement between the first group of vehicles and the second group of vehicles;

determining, by the machine-learning logic, the plurality of actions based on the observation data that, when performed by the first group of vehicles during the first interval, are predicted by the machine-learning logic to result in removal of one or more vehicles of the second group of vehicles from the engagement zone during the engagement, wherein the machine-learning logic is trained using a reinforcement learning technique and on a plurality of simulated engagements between the first group of vehicles and the second group of vehicles to determine sequences of the plurality of actions that are predicted to result in the one or more vehicles of the second group of vehicles being removed from the engagement zone; and directing, by the machine-learning logic, action data indicative of the plurality of actions to the first group of vehicles.

19. The non-transitory computer-readable medium according to claim 18,
wherein the machine-learning logic comprises a policy network and a value network, wherein the instruction code is executable by the processor to perform further operations comprising:

training the policy network using a first reinforcement learning technique that configures aspects of the policy network to output the plurality of actions, based on a plurality of observations, by minimizing a policy loss function; and training the value network using a second reinforcement learning technique that configures aspects of the value network to output a value for each of the plurality of states, based on the plurality of observations and the plurality of actions, by minimizing a value loss function, wherein the policy loss function is a function of the value loss function.

20. The non-transitory computer-readable medium according to claim 18, wherein the instruction code is executable by the processor to perform further operations comprising:

deriving at least some of the observation data from sensors of the first group of vehicles; and communicating information associated with the plurality of actions to respective vehicle management or autopilot systems of the first group of vehicles.

\* \* \* \* \*